(12) United States Patent
Wagner et al.

(10) Patent No.: US 7,355,790 B1
(45) Date of Patent: Apr. 8, 2008

(54) OPTICAL SIGHT HAVING A RETICLE ILLUMINATED THROUGH A NON-LAMBERTIAN LIGHT DIFFUSER

(75) Inventors: Kevin B. Wagner, Wyevale (CA); Andrew J. Hoy, Phelpston (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/499,168

(22) Filed: Aug. 4, 2006

(51) Int. Cl.
*G02B 23/00* (2006.01)
*F41G 1/00* (2006.01)

(52) U.S. Cl. ...................... 359/424; 359/399; 359/428; 42/130

(58) Field of Classification Search ................. 359/15, 359/28, 399–429, 599, 707, 808–821; 42/101–130
See application file for complete search history.

(56) References Cited

U.S. PATENT DOCUMENTS

| | | | | |
|---|---|---|---|---|
| 3,672,782 A | * | 6/1972 | Akin, Jr. ...................... | 356/251 |
| 4,199,220 A | * | 4/1980 | Casagrande .................. | 359/505 |
| 4,806,007 A | * | 2/1989 | Bindon ........................ | 359/424 |
| 5,434,704 A | * | 7/1995 | Connors et al. ............. | 359/403 |
| 5,497,266 A | * | 3/1996 | Owen .......................... | 359/353 |
| 5,744,790 A | | 4/1998 | Li ............................... | 235/462.24 |
| 5,838,403 A | * | 11/1998 | Jannson et al. ............... | 349/65 |
| 5,859,418 A | | 1/1999 | Li et al. ...................... | 235/462.41 |
| 5,917,655 A | * | 6/1999 | Lehnen et al. ............... | 359/625 |
| 6,031,604 A | * | 2/2000 | Pniel ............................ | 356/124 |
| 6,065,678 A | | 5/2000 | Li et al. ...................... | 235/462.46 |
| 6,798,508 B2 | | 9/2004 | Kramer ........................ | 356/338 |
| 6,869,569 B2 | | 3/2005 | Kramer ........................ | 422/73 |
| 6,922,241 B2 | | 7/2005 | Kramer ........................ | 356/338 |
| 2001/0000739 A1 | * | 5/2001 | Savant ......................... | 428/156 |
| 2005/0225853 A1 | * | 10/2005 | Hakansson et al. ......... | 359/399 |
| 2006/0107581 A1 | * | 5/2006 | Ball ............................ | 42/130 |

OTHER PUBLICATIONS

Material Safety Data Sheet for CELCON M25-01 CF2001, 6 pages total (2001).

* cited by examiner

*Primary Examiner*—Thong Q. Nguyen
(74) *Attorney, Agent, or Firm*—H. St. Julian

(57) ABSTRACT

An optical sight includes an optical train having an optical path therethrough. The optical train typically includes an objective, a prism that receives the optical path from the objective, and an eyepiece that receives the optical path from the prism. A reticle is formed on a surface of the prism. The reticle is illuminated by a reticle illumination source including a light source having a light-source output beam that illuminates the reticle, and a light diffuser lying in the light-source output beam between the light source and the reticle. The light diffuser is made of a non-lambertian material such as acetal.

11 Claims, 3 Drawing Sheets

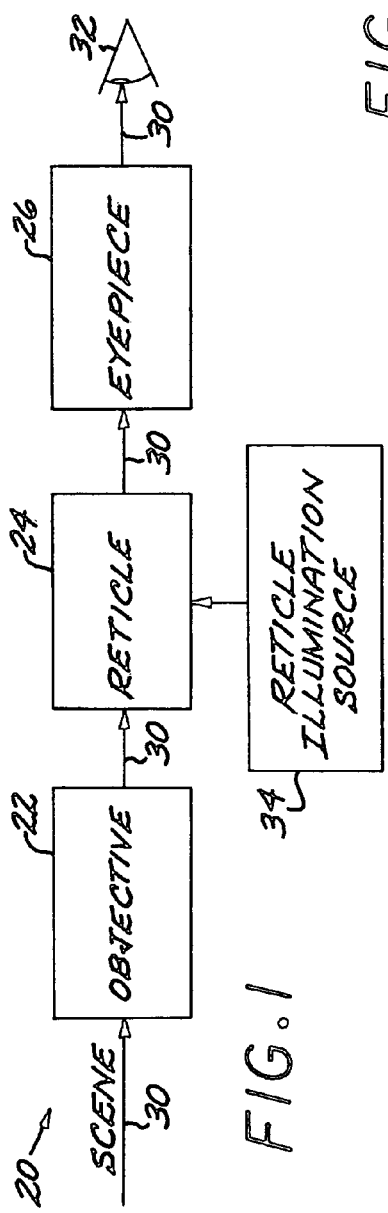
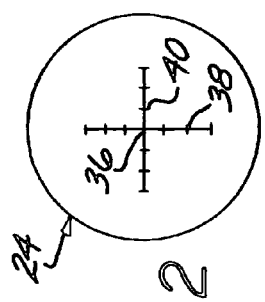
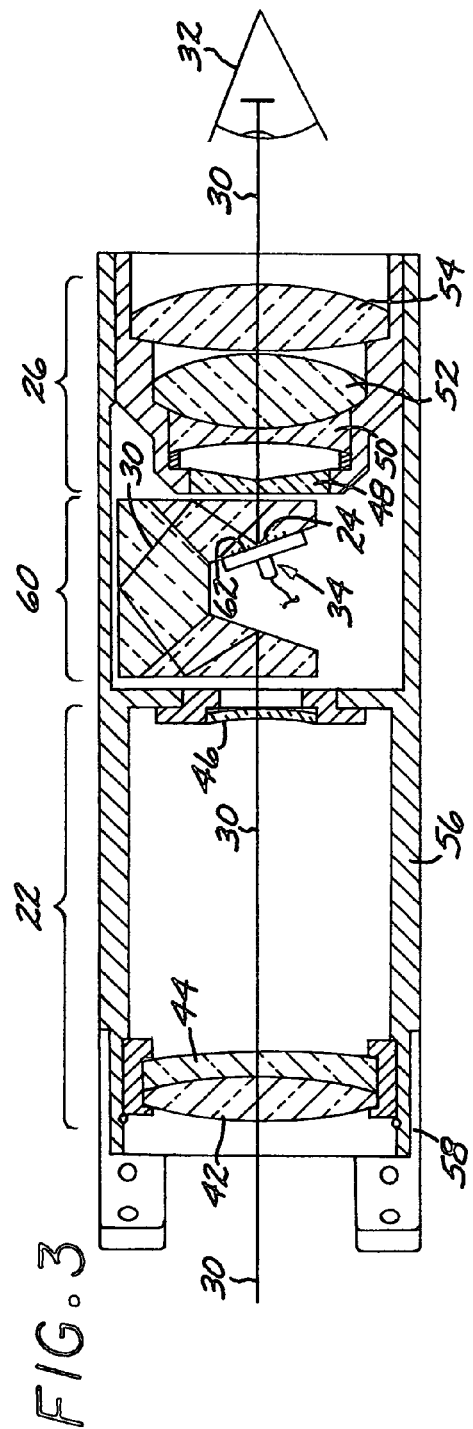

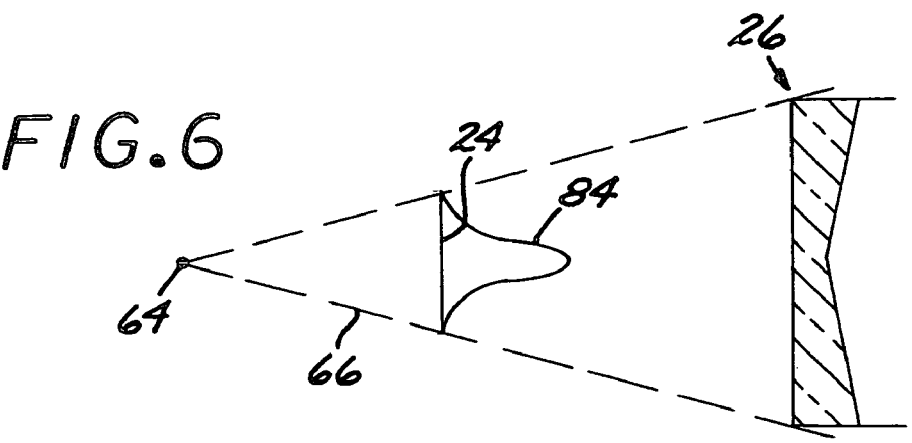
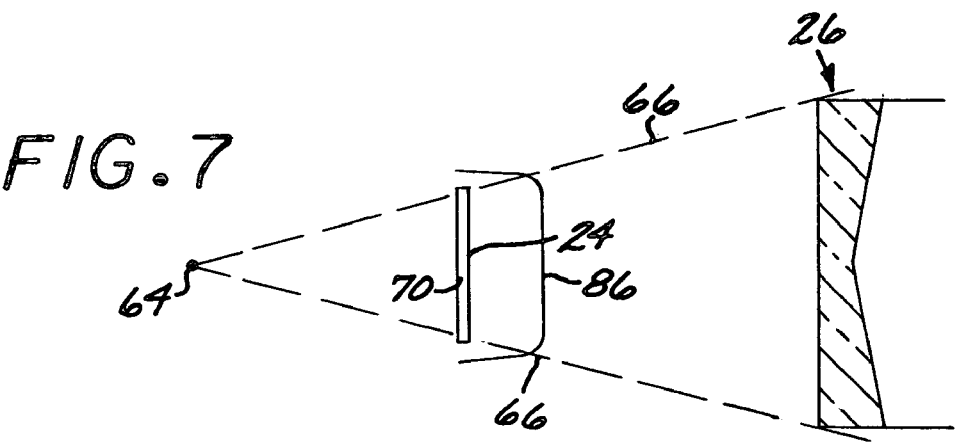
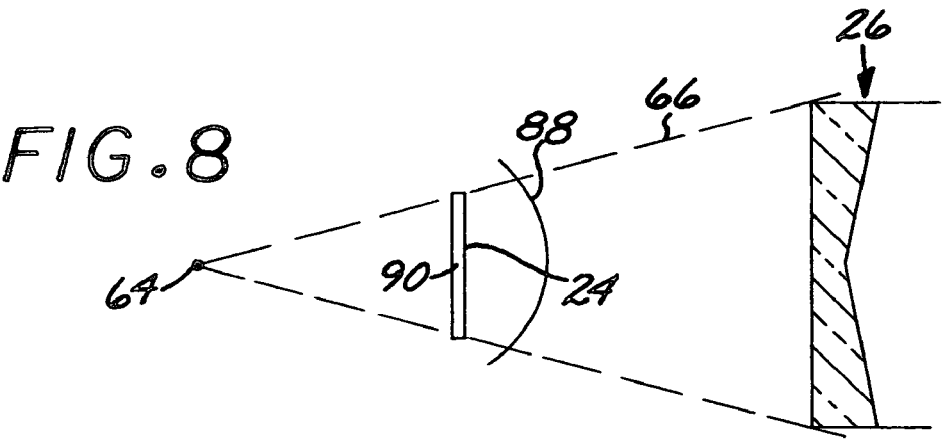

OPTICAL SIGHT HAVING A RETICLE ILLUMINATED THROUGH A NON-LAMBERTIAN LIGHT DIFFUSER

This invention relates to an optical sight having an illuminated reticle and, more particularly, to such an optical sight wherein the reticle illumination includes an acetal light diffuser.

BACKGROUND OF THE INVENTION

Refractive or reflective optical sights are used in a wide variety of applications to obtain increased magnification of a scene. In one common application, an optical sight is affixed to the upper side of the barrel of a rifle-type weapon used by a soldier or a hunter. The user sights through the optical sight to acquire a target and aim the weapon toward the target to increase the likelihood of hitting the target with a projectile fired from the weapon.

A reticle is typically provided in the optical path of the optical sight to aid the user of the weapon in aiming the weapon. The reticle normally has reference markings or other information that aids the user in aiming the optical sight and thence the weapon toward the intended target. The reference markings usually include a cross hair, bulls-eye, center dot, or similar marking to indicate the bore sight of the weapon. The reference markings may also include elevation, windage, and other reference markings that assist the user in aiming the weapon.

In some designs, the reticle is illuminated by an artificial light source within the optical sight. The user of reticle illumination adds cost and weight, but it ensures that the reticle will be visible in a wide range of lighting conditions including normal daylight, low-light ambient conditions, and, particularly for infrared and other optical sights to be used at night, near-darkness conditions. If the reticle is not visible to the user, its advantages are lost.

There is a need for an approach to ensure proper illumination of the reticle of an optical sight, so that the reticle always remains visible to the user peering through the optical sight. The present invention fulfills this need, and further provides related advantages.

SUMMARY OF THE INVENTION

In the work leading to the present invention, the inventors have determined that the illumination of the reticle ideally satisfies a number of requirements. The reticle illumination must be relatively uniform over the entire reticle so that the entire acceptance angle of the eyepiece is filled. If the illumination is not uniform with the result that the entire acceptance angle of the eyepiece is not filled or is nonuniformly illuminated, the illumination of the reticle may be greatly diminished or lost entirely when the user's sighting eye moves off the optical path of the optical sight. The reticle then disappears from view, and the usefulness of the weapon is greatly diminished. The need for uniform reticle illumination is critical for weapons used in military applications, because it may be expected that the user cannot always keep the head stationary so that the eye peering through the optical sight is always on the optical path of the optical sight. The illumination also must be adjustable and must have low power consumption, because it is normally battery powered.

The present approach provides an optical sight having a reticle that is uniformly illuminated over the entire acceptance angle of the eyepiece to fill the exit pupil of the eyepiece. When the user moves his eye off the optical path by small amounts, the reticle remains illuminated and visible. The intensity of the reticle illumination is controllable over a wide range by the user. The present approach allows the use of compact, low-power-consumption illumination sources.

In accordance with the invention, an optical sight comprises an optical train having an optical path therethrough, a reticle coincident with the optical path, and a reticle illumination source. The reticle illumination source includes a light source having a light-source output beam that illuminates the reticle, and a light diffuser lying in the light-source output beam between the light source and the reticle. The light source is preferably a light-emitting diode (LED), most preferably a resonant cavity light emitting diode (RCLED). The light diffuser is made of acetal.

In a preferred approach, the optical train comprises a set of lenses. The optical train may also include a reflective optical element, and the prism may have the reticle formed on a reflective surface thereof. In an especially preferred approach, the optical train includes an erector prism having the reticle formed on a surface thereof, and the reticle illumination source is positioned to illuminate the reticle on the surface of the erector prism.

The light diffuser is preferably a sheet of acetal such as a freestanding sheet of acetal. The thickness of the light diffuser depends upon the details of the optical design of the optical sight, including the transverse size of the reticle, the brightness of the reticle illumination source, the placement of the reticle illumination source, and the optical angles.

In another embodiment, an optical sight comprises an optical train having an optical path therethrough. The optical train comprises an objective, a prism such as an erector prism that receives the optical path from the objective, and an eyepiece that receives the optical path from the erector prism. A reticle is formed on a surface of the erector prism. A reticle illumination source includes a light source having a light-source output beam that illuminates the reticle, and a light diffuser lying in the light-source output beam between the light source and the reticle. The light diffuser is made of acetal. Other compatible features discussed herein may be utilized with this embodiment.

In yet another embodiment, an optical sight comprises an optical train comprising in order an objective, a reticle, and an eyepiece having an acceptance angle. A reticle illumination source illuminates the reticle over an area to entirely fill the acceptance angle and thereby fill an exit pupil of the eyepiece. The reticle illumination source comprises a light source having a light-source output beam, and a light diffuser lying in the light-source output beam. The light diffuser is made of a solid non-lambertian material, preferably acetal. Other compatible features discussed herein may be utilized with this embodiment.

The present approach uses a non-lambertian material such as acetal as a light diffusing medium for the light source. The diffusing medium ensures that the reticle is fully and uniformly illuminated, across the entire acceptance angle and exit pupil of the eyepiece. Consequently, the user's eye may move relative to the optical sight and yet retain a good view of the sighted image and the superimposed reticle. The acetal light diffuser may be selected in a thickness that is sufficiently thin (e.g., 0.05 millimeter to 4 millimeters) that the light output of the light source may be small but adjustable. The small-output requirement of the light source allows a compact, low-output light source to be used, which minimizes power consumption by the light source.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of an optical sight;

FIG. 2 is a back elevational depiction of a reticle;

FIG. 3 is a sectional view of a portion of one embodiment of the optical sight of FIG. 1;

FIG. 6 is a schematic view of the illumination of the eyepiece by the reticle illumination source, for an optimal emission angle without a diffuser;

FIG. 7 is a schematic view of the illumination of the eyepiece by the reticle illumination source, for an optimal emission angle and with a non-lambertian diffuser; and FIG. 8 is a schematic view of the illumination of the eyepiece by the reticle illumination source, for an optimal emission angle and with a lambertian diffuser.

DETAILED DESCRIPTION OF THE INVENTION

Figure 4:
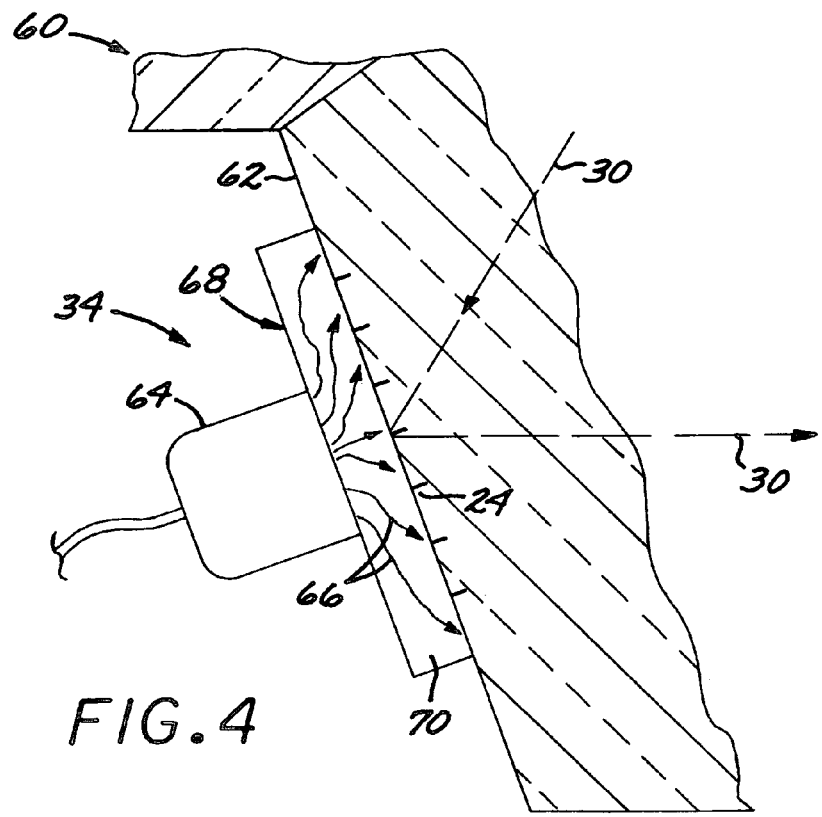
FIG. 4 is a detail of FIG. 3 illustrating the reticle and the reticle illumination source.

FIG. 1 depicts in general form an optical sight 20 according to the present approach. The optical sight 20 includes an objective 22, a reticle 24, and an eyepiece 26. Each of the objective 22 and the eyepiece 26 preferably includes one or more lenses. The objective 22 and the eyepiece 26 together constitute an optical train with an optical path 30 therethrough. Light travels along the optical path 30 from a scene to the objective 22, from the objective 22 to the eyepiece 26, and from the eyepiece 26 to an eye 32 of the user of the optical sight. The reticle 24 is superimposed upon and coincident with the optical path 30 at some point, normally between the objective 22 and the eyepiece 26, before the optical path enters the eye 32 of the user. The reticle 24 is illuminated by a reticle illumination source 34.

The reticle 24 is a pattern of markings that provide a spatial reference for the user relative to the scene and to the optical sight 20. FIG. 2 illustrates a typical reticle 24. There is typically a boresight marking 36, such as a cross hair, and there may be other markings such as elevation markings 38 and/or windage markings 40. Optionally, other information may be permanently or temporarily shown in the reticle 24. The reticle 24 may be a freestanding element, or it may be defined on a surface through which the optical path 30 passes or from which the optical path 30 is reflected. When the reticle 24 is defined on a surface, it is typically formed on that surface by etching or engraving. The reticle 24 may be positioned between the objective 22 and the eyepiece 26 as illustrated, or may be positioned between or upon some of the individual elements of the objective 22 or the eyepiece 26. The presently preferred embodiment is a reticle defined on a surface from which the optical path 30 reflects, and that embodiment will be described in detail.

FIG. 3 depicts such a preferred embodiment of the optical sight 20. Previously described elements are indicated, and the prior description is incorporated. The objective 22 includes three objective lenses 42, 44, and 46, with lenses 42 and 44 a cemented doublet. The eyepiece 26 includes four eyepiece lenses 48, 50, 52, and 54. This arrangement of the lenses for the objective 22 and the eyepiece 26 is illustrative and not limiting. Other types of objectives 22 and eyepieces 26 may be used. All of the elements are enclosed in a housing 56, which has an attachment 58 for attaching the housing 56 to a rifle or other structure (not shown) that is to be aimed with the assistance of the optical sight 20.

The objective 22 inverts the image from the scene as it travels along the optical path 30. To re-invert the image so that it may be comfortably viewed by the user without changing the magnification of the image, an optically unpowered erector prism 60 is positioned on the optical path 30 between the objective 22 and the eyepiece 26. The erector prism 60 includes mirror surfaces provided as three prism elements, and the optical path 30 is reflected from reflecting surfaces of the erector prism 60 as it passes through the erector prism 60 as illustrated in FIG. 3. The optical path 30 leaves the erector prism 60 on its way to the eyepiece 26 after reflecting from a final reflecting surface 62.

In the preferred embodiment illustrated in greater detail in FIG. 4, the reticle 24 is formed on the final reflecting surface 62 of the prism 60, preferably by etching or engraving. That is, the reticle 24 is a pattern of lines or other features on the final reflecting surface 62 of the erector prism 60.

The reticle illumination source 34 includes a light source 64 having a light-source output beam 66 that illuminates the reticle 24. The light source 64 is preferably a light-emitting diode (LED), and most preferably a resonant cavity light-emitting diode (RCLED). The RCLED is particularly advantageously utilized for this application. The RCLED has a narrow spectral output and a small spot size. It produces a high-intensity light-source output beam 66 with a linear output intensity as a function of current. There is no threshold knee as with some conventional LEDs. RCLEDs are available commercially in various wavelengths, such as that producing the red color preferred for reticle illumination.

Figure 5:
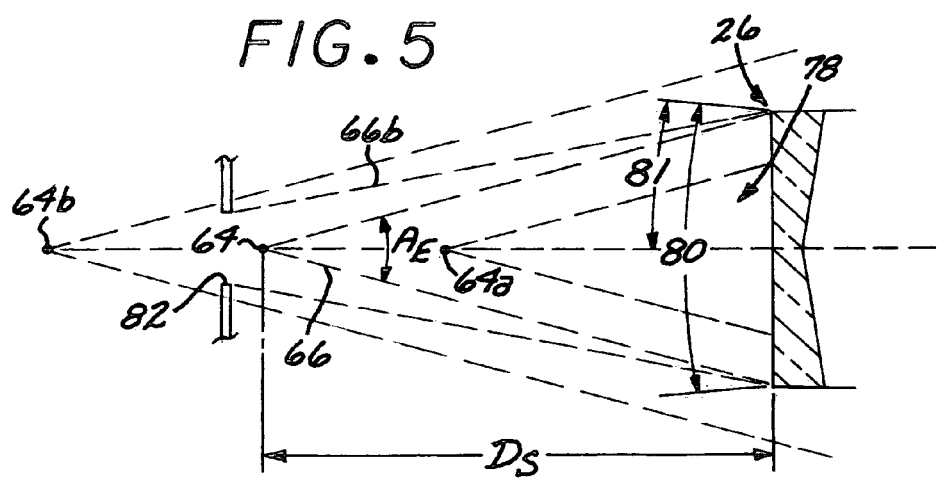
FIG. 5 is a schematic view of the illumination of the eyepiece by the reticle illumination source, for various positions of the reticle illumination source.

FIG. 5 depicts the approach for selecting the position of the light source 64 in the embodiment of FIGS. 3-4. The light-source output beam 66 is aimed toward the facing end 78 of the eyepiece 26. The eyepiece 26 has a vertex angle 80 (for which the acceptance angle 81 is the half-angle) that defines the largest cone of light that is accepted by the eyepiece 26. The vertex angle 80 and the acceptance angle 81 are characteristics of the optics of the eyepiece 26, and are taken as fixed, provided values in selecting the positioning of the light source 64. The light-source output beam 66 must fill the entire acceptance angle of the eyepiece 26 to fill the exit pupil of the eyepiece 26. (Stated alternatively, the light-source output beam 66 fills the numerical aperture so that the exit pupil of the eyepiece 26 is filled.) The light source 64 has an emission angle $A_E$. When the light source 64 is positioned at distance $D_S$, the light-source output beam 66 exactly fills the acceptance angle of the eyepiece 26 at the facing end 78 of the eyepiece 26. If the light source is positioned at a distance less than $D_S$, as depicted for a light source 64a, the acceptance angle is not filled. If the user of the optical sight moves the eye 32 away from the optical path 30, the reticle 24 can disappear from view. On the other hand, if the light source is positioned at a distance greater than $D_S$, as depicted for a light source 64b, the acceptance angle is overfilled. The user does not lose sight of the reticle 24 when the eye 32 is moved, but some light energy is wasted. The wasting of light energy is not a problem in many applications, but in this case it is, because the light source 64 is battery powered, and it is desirable that battery power not be wasted. If the light source is positioned at the distance greater than $D_S$, an aperture 82 may be used to limit the effective size of the light-source output beam 66b to avoid stray light, but some light energy is still wasted.

The placement of the light source 64 does not complete the design, because the light-source output beam 66 produced by an LED or other source is typically not uniform. FIG. 6 illustrates the light intensity 84 as a function of angular position for the optimally positioned light source 64. Because the light-source output beam 66 has an intensity distribution as a function of angle, the reticle 24 is not uniformly illuminated. The non-uniform illumination is distracting to the user and may adversely affect the functionality of the optical sight 20.

To achieve a more-uniform illumination, a light diffuser 68 lies in the light-source output beam 66 between the light source 64 and the reticle 24. The light diffuser 68 is made of a non-lambertian material that transmits the wavelength of light produced by the light source 64. FIG. 7 depicts the light intensity 86 as a function of angle for the light-source output beam 66 after passing through the non-lambertian diffuser 68. The light passing through the non-lambertian diffuser 68 is much more uniform than is the undiffused light intensity distribution 84 of FIG. 6. The light diffuser 68 is preferably made of acetal, preferably in the form of a thin, freestanding sheet 70 as illustrated. Acetal, also termed polyoxymethylene, is assigned CAS number 24969-26-4, and has a structural formula of —[$H_2CO$]$_n$—.

The light diffuser 68 is preferably placed closely, most preferably as closely as possible, to the plane of the reticle 24. In the preferred embodiment of FIG. 4, the acetyl sheet 70 is placed in direct contact with the final reflecting surface 62 upon which the reticle 24 is formed. The acetal sheet 70 has a thickness that is selected to give sufficient light diffusion but not so thick as to unduly attenuate the light-source output beam 66. To meet these requirements in various optical designs, sheets 70 of acetal have been tested from about 0.1 to about 3 millimeters in thickness with good results.

The use of a non-lambertian diffuser is to be compared with the use of a lambertian diffuser. A lambertian diffuser is one whose output obeys Lambert's cosine law. That is, its output has an angular intensity distribution that is proportional to the cosine of the angle from which it is viewed. Many types of diffusers are lambertian. As depicted in FIG. 8, a lambertian diffuser 90 is not optimal for the present application. With a lambertian diffuser, much of the light intensity is diffused to a higher angle and out of the desired optical path 30, thus wasting that light energy. As noted earlier, in the present application achieving maximum illumination over the full reticle 24 with minimal power consumption from the battery is important, and therefore the non-lambertian diffuser 70 of FIG. 7 is used. Examples of sheet diffuser materials that were tried but found insufficient for the present application include nylon and teflon. Solid translucent particles are also insufficient.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical sight comprising
   a housing;
   an objective lens and an eyepiece lens mounted in the housing for forming an optical path therethrough, the eyepiece lens having a vertex angle;
   a reticle located in the housing between the objective lens and the eyepiece lens and forming a plane;
   an adjustable light source for illuminating the reticle, the light source having an output beam directed toward the eyepiece lens and being located to exactly fill the vertex angle of the eyepiece lens; and
   a light diffuser of preselected thickness positioned by the light source and immediately adjacent the plane of the reticle for relatively uniformly illuminating the entire reticle, wherein power consumption of the optical sight is minimized.

2. The optical sight of claim 1, wherein the light source has a narrow spectral output, a small spot size a high intensity output beam and a linear output intensity as a function of current.

3. The optical sight of claim 2, wherein the light source is a resonant cavity light-emitting diode.

4. The optical sight of claim 1, including an erector prism mounted in the housing and located between the objective lens and the eyepiece lens.

5. The optical sight of claim 1, wherein the erector prism has multiple reflective surfaces in the optical path; and
   the reticle is formed on a last of the multiple reflective surfaces.

6. The optical sight of claim 1, wherein the light diffuser transmits the wavelength of light produced by the light source, provides sufficient light diffusion and does not unduly attenuate the output beam of the light source.

7. The optical sight of claim 6, wherein the light diffuser is made of acetal.

8. The optical sight of claim 7, wherein the light diffuser comprises a freestanding sheet of acetal.

9. The optical sight of claim 7, wherein the acetal light diffuser has a thickness of between and including 0.05 mm and 4 mm.

10. The optical sight of claim 7, wherein the acetal light diffuser has a thickness of about 0.1 mm to about 3 nm.

11. The optical sight of claim 1, wherein the light source is a light-emitting diode.

* * * * *